(12) United States Patent
Lillie

(10) Patent No.: US 8,295,785 B2
(45) Date of Patent: Oct. 23, 2012

(54) TRANSMISSION AND/OR RECEPTION PROCESS WITH HIGH CHANNEL CAPACITY, TRANSMITTER AND/OR RECEIVER, AND MOBILE TERMINAL

(75) Inventor: Frank Lillie, Westensee (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 696 days.

(21) Appl. No.: 11/577,971

(22) PCT Filed: Jul. 26, 2005

(86) PCT No.: PCT/EP2005/053626
§ 371 (c)(1),
(2), (4) Date: Aug. 19, 2008

(87) PCT Pub. No.: WO2006/045645
PCT Pub. Date: May 4, 2006

(65) Prior Publication Data
US 2009/0156140 A1    Jun. 18, 2009

(30) Foreign Application Priority Data
Oct. 25, 2004    (DE) .................. 10 2004 051 835

(51) Int. Cl.
*H04B 1/38* (2006.01)
(52) U.S. Cl. ........................................... 455/90.2
(58) Field of Classification Search .................. 455/90.2
See application file for complete search history.

(56) References Cited

U.S. PATENT DOCUMENTS

| 4,777,655 A | 10/1988 | Numata et al. |
| 5,649,314 A | 7/1997 | Yamada et al. |
| 5,748,103 A | 5/1998 | Flach et al. |
| 7,471,694 B2 * | 12/2008 | Kent et al. ..................... 370/464 |

FOREIGN PATENT DOCUMENTS

| CN | 1111886 A | 11/1995 |
| CN | 1286531 A | 3/2001 |
| EP | 0 361 350 | 4/1990 |
| EP | 0 656 693 | 6/1995 |
| WO | WO 01/15313 A1 | 3/2001 |

OTHER PUBLICATIONS

Feng et al., "An Analysis of MIMO Channel's Capacity and Its Application in 3G", Communications Technology, 2003, vol. 11, No. 143.

* cited by examiner

*Primary Examiner* — Duc Nguyen
*Assistant Examiner* — Ankur Jain

(57) ABSTRACT

A transmission and/or reception process with high channel capacity uses a multiple transmitter and/or receiver system, and signal processing undergoes phases of temporary switching-off. Also disclosed arm corresponding transmitters and/or receivers, as well as a mobile terminal. In order to provide a process, a device and a mobile terminal of the above-mentioned type which improve communication reliability with high spectral efficiency using multipath propagation, it is proposed that the mixer units (5) be initialized when signal processing is turned on.

14 Claims, 1 Drawing Sheet

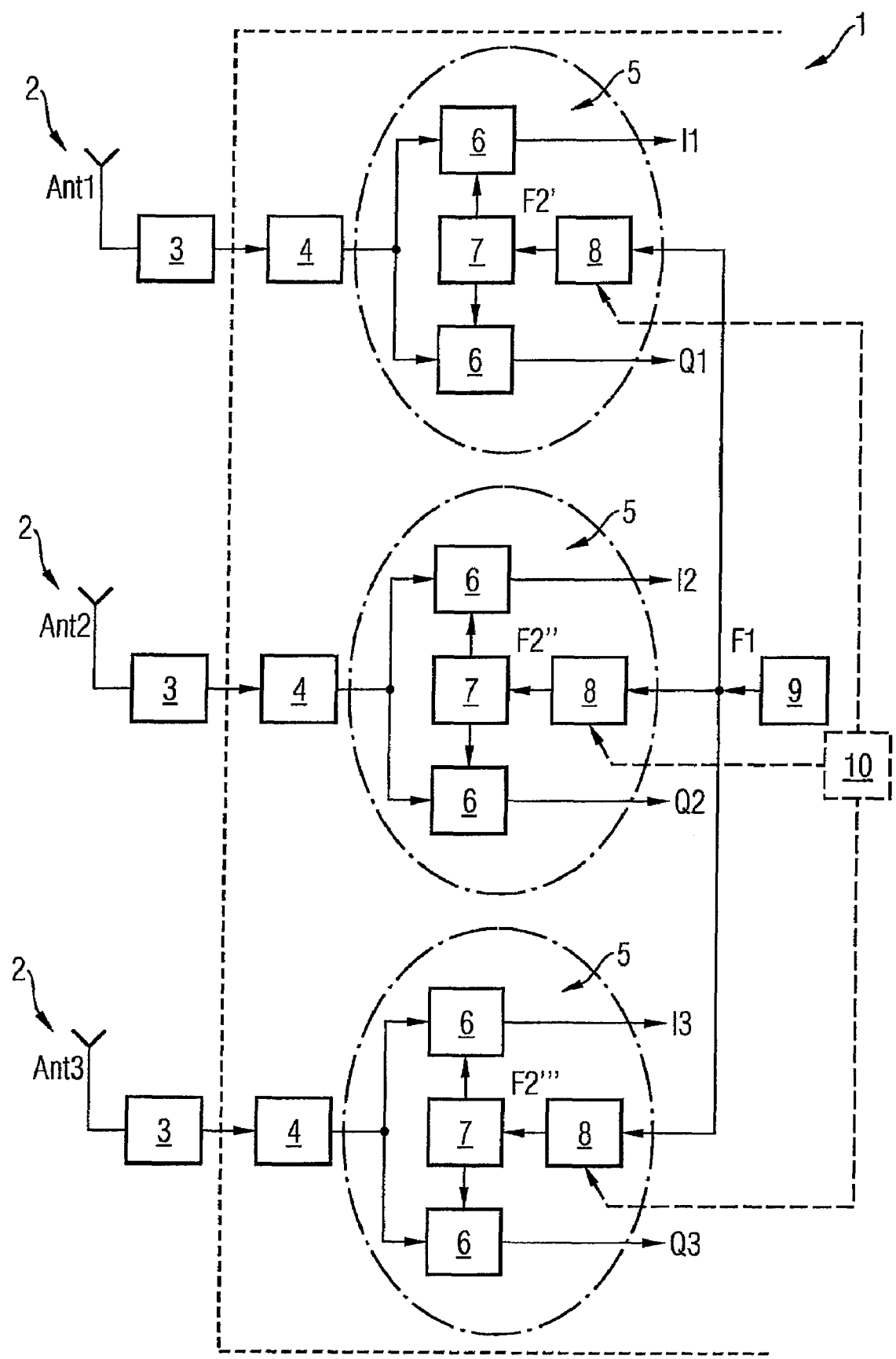

US 8,295,785 B2

TRANSMISSION AND/OR RECEPTION PROCESS WITH HIGH CHANNEL CAPACITY, TRANSMITTER AND/OR RECEIVER, AND MOBILE TERMINAL

CLAIM FOR PRIORITY

The present invention claims priority to PCT/EP2005/053626 which was filed Jul. 26, 2005 and DE 10 2004 051 835.1 which was filed Oct. 25, 2004.

TECHNICAL FIELD OF THE INVENTION

The present invention relates to a transmitting and/or receiving method with high channel capacity, a transmitting and/or receiving device and a mobile terminal for voice and data communication.

BACKGROUND OF THE INVENTION

Without foregoing other possible uses of the present invention in the field of voice and/or data communication via an air interface, only one application in the mobile radio sector will be discussed in the text which follows. Products in the PC, PDA and/or mobile radio sector are known as complete terminals and as plug-in or extension units. They are subject to high price pressure, this field of application being distinguished by particularly high requirements for the signal quality with very little available space for a corresponding circuit and strict restrictions with regard to the energy demand. Accordingly, the method and device of the type initially mentioned will also find application in the very small communication devices according to the Global System for Mobile Communication GSM and the Unified Mobile Telecommunications system UMTS standard.

For increasing the usable channel capacities, system considerations for communication systems and mobile radio devices beyond the third generation of mobile radio systems go in the direction of multi-transmitter and/or multi-receiver systems. In this context, the possible transmittable data rate is increased by utilizing a further dimension, namely space, by means of multi-path propagation. These methods are known from the literature by the following names Multiple Input Multiple Output, MIMO in brief,
Single Input Multiple Output, SIMO in brief, and
Multiple Input Single Output, MISO in brief.

As a rule, they use a number of complete transmitting and receiving paths, these paths being accounted for jointly in the digital signal processing. Accordingly, each transmission path requires, e.g., a receiving chain with antenna, preamplifier, mixer, filter and A/D converter. All systems operating in accordance with the MIMO principle have in common that different data streams are transmitted at the same frequency and at the same time in one channel, this channel usually being designed for a SISO application with regard to the bandwidth provided for it.

The data streams are assembled or separated algorithmically at the transmitting and receiving end in the respective signal processing arrangement. There are MIMO system proposals which operate with or without feedback from a receiver to the transmitter. In the systems with feedback, the characteristics of the MIMO transmission channel are estimated at a time T1, then the channel information is transmitted via a return channel to the transmitter so that the latter can carry out a corresponding predistortion of the transmitting signal which is sent out at time T2, with the aim of maximizing the data throughput. The result of the channel estimation is a complex matrix, the rank of which corresponds to the number of transmission paths which form a MIMO transmission channel from part-transmission channels. The assumption here is that the propagation conditions do not significantly change between the times T1 and T2 so that the channel estimation is still correct. These methods are known in principle from the literature.

SUMMARY OF THE INVENTION

In the text which follows, a number of complete receiving paths are ideally integrated in one chip. It is generally assumed that a system is used in which signal processing is subject to phases of temporary disconnections. In other words, a system is considered which is temporarily disconnected at least in part. The extent of the disconnection can vary depending on the embodiment. The aim of this is to make an effective contribution to lowering internal interference and interference caused by unused transmitting power within a radio cell. This procedure also allows one or more assemblies in the receiver to be disconnected in the intervals between reception for the purpose of saving power. Naturally, transmitters can also be correspondingly designed and operated.

The present invention discloses a method, a device and a mobile terminal of the type initially mentioned which in each case improves the reliability of a communication with high spectral efficiency, utilizing multi-path propagation.

According to one embodiment of the invention, there is a method of the type initially mentioned, in that when the signal processing is switched on, the respective mixer units are initialized. Accordingly, a circuit according to the invention has a device for initializing the respective mixer units in order to achieve the above object.

In a MIMO system, it should be ensured that, after the signal processing device is switched on again, it is not only the frequency stability which is achieved in time as is the case in currently used systems. Instead, attention should also be paid to the fact that the phase relationship of the individual mixing frequencies with respect to one another corresponds to that of the time T1 of the temporary disconnection. Otherwise, the entire channel estimation and predistortion etc. is invalid. In the current SISO systems, in contrast, this phase can randomly assume different values. This problem does not exist in the conventional chip sets designed for SISO applications where only the frequency stability needs to be ensured. However, this requires attention to a settling time of the synthesizer.

As a an embodiment of the invention, the special form of a temporary disconnection in the form of transmitting and/or receiving in defined time slots is provided, as is already implemented in SISO systems, e.g. in Global System for Mobile Communication, GSM in brief,
Enhanced Data Rates for GSM Evolution, EDGE in brief,
or in particular modes within the UMTS standard, as a few examples. The important factor here is, with very narrow time constraints, to take care, when the signal processing device is switched on again at a time T2, that is to say for receiving the next time slot, that the phase relationship of the individual mixing frequencies with respect to one another corresponds to that of the time T1 of the temporary disconnection. In every other case, a preceding channel estimation with corresponding adaptations and predistortions etc. is invalid in a MIMO system, with or without return channel, and leads to unusable results.

The use of an initialization circuit in the form of a reset circuit which simultaneously addresses all mixer units of the data processing paths arranged in parallel is particularly advantageous. All mixer units will thus count synchronized from the same time predetermined by a reset. The reset is a digital reset.

In a preferred embodiment of the invention, a defined preload takes place. All mixer units of the data processing paths arranged in parallel receive an identical initialization value at the same time in this manner.

In another embodiment of the invention, within the respective mixer units, considered as an assembly the divider or frequency converters, respectively, are driven. In an architecture, proposed in the further text, of a device according to the invention, a local oscillator, which is adjusted to a frequency F1 with the aid of a synthesizer circuit, feeds the several mixer units provided for mixing down the received signals. In this arrangement, it is a technique, known per se, that the local oscillator oscillates at a higher frequency than the actual mixing frequency. The local oscillator frequency F1 is only converted, or divided down, respectively, by dividers to an actual mixing frequency F2, locally directly before the mixer cells. This spatial arrangement in the immediate vicinity is chosen for minimizing disturbances. Thus, the dividers simultaneously receive a reset within the mixer assemblies or they are set in defined manner to common starting values by a preload.

In one embodiment of the invention, so-called regenerative dividers are used as frequency converters which can also perform an arbitrarily adjustable odd-numbered division of the local oscillator frequency as know in the art. In contrast, conventional dividers are counters which implement a predetermined division, for example, via overflow control. This only provides for an even-numbered division 1:N with N=2, 3, 4, 5, . . . .

In such a regenerative divider, a reset is carried out via a switch in at least one feedback branch. The switch is closed in defined manner by the reset pulse so that the divider, and thus the mixer as an entire assembly, immediately begins to operate.

In the method and device according to the invention are particularly advantageously used in a direct conversion architecture which can be used both for transmitting and for receiving units. It is assumed that the oscillator does not oscillate directly at the receiving and/or transmitting frequency but is only divided down to the actual frequency directly before the respective mixer units. This procedure reduces side effects and disturbances. Accordingly, one divider stage each is provided per mixer unit, the divider stage being connected to a synchronization network, according to the invention, and driven for synchronization.

The present invention also relates to a mobile terminal, particularly a mobile radio device for voice and/or data communication which has a device according to the invention.

BRIEF DESCRIPTION OF THE INVENTION

Further advantages of a method according to the invention and of a device for converting a method according to the invention which, in particular, is a component of a mobile radio terminal, will be described in the text which follows, with reference to the representation of an exemplary embodiment by means of the drawing.

FIG. 1 shows a block diagram of a MIMO receiver according the present invention.

DETAILED DESCRIPTION OF THE INVENTION

The FIGURE of the drawing shows a block diagram of a MIMO receiver 1. In this arrangement, the possible transmittable data rate is increased by utilizing a further dimension by means of space, due to selective multi-path propagation. Accordingly, the MIMO receiver 1 has in the present example three completely formed receiving paths 2 separated from one another. The circuit of each of the receiving paths 2 consists of a respective antenna Ant1, Ant2, Ant3 followed by input filters 3, preamplifier 4, mixer unit 5 with two mixers 6, phase shifter 7 and frequency converter 8 and an oscillator 9. In the course of a multi-path propagation, a received signal in each case passes via one of the antennas Ant1, Ant2, Ant3, input filters 3 and preamplifier 4 to the respective complex mixers 6. In this arrangement, only one oscillator 9 is provided which jointly feeds all receiving paths 2. After frequency conversion in a divider 8, the signal of the oscillator 9 is processed in each receiving path 2 by the phase shifter 7 into two mutually orthogonal signals which are supplied to the actual mixers 6 where it is converted into an intermediate frequency IF with the aid of a mixing frequency F2', F2" and F2'", defined by the dividers 8. In the present exemplary case, this intermediate frequency IF has been selected to be zero and this is therefore a so-called direct conversion architecture.

In a mixer unit 5 or mixer stage, a frequency converter 8 is located directly before the respective mixer 6 which is fed with a frequency F1 of the oscillator 9 and outputs a frequency F2. Together with the mixer 6 and the phase shifter 7, the frequency converter 8, as mixer unit 5, virtually forms one constructional unit which, to reduce noise influences, are also arranged closely adjacently spatially as circuit parts on one chip.

The resultant output signal can be described with an in-phase component 11, 12, 13 and with a quadrature component Q1, Q2, Q3 for each receiving path 2. Further processing of the three components of the output signal can remain unconsidered at this point.

According to the invention, it is then ensured that the phase relationship of the individual mixing frequencies F2', F2" and F2'" with respect to one another is always the same due to an initialization circuit 10. This especially applies after the power-up of the radio part for receiving the next time slot in a TDMA method but naturally also after a disconnection phase during the restart of the MIMO receiver 1. The initialization circuit 10 in the form of a reset circuit simultaneously addresses all mixer units 5 of the data processing paths 2 arranged in parallel. All mixer units 5 thus count synchronized from the same time predetermined by a respective reset. The reset is a digital reset which, in the present exemplary case, takes place as a defined preload of a predetermined value in the frequency converters 8. In this manner, all mixer units 5 of the data processing paths 2 arranged in parallel receive an identical initialization value at the same time.

In the preceding text, mixer units 5 were discussed since within the respective mixer units 5, considered as an assembly, the dividers or frequency converters 8 are driven. In an architecture, proposed in the further text, of a device according to the invention, a local oscillator 9, which is adjusted to a frequency F1 with the aid of a synthesizer circuit, feeds the several mixer pairs provided for mixing down the received signals. It is conventional technology that the local oscillator 9 oscillates at a higher frequency than the actual mixing frequency. The frequency F1 is converted or divided down, respectively, by dividers 8 to an actual mixing frequency F2 locally directly before the mixer cells 6. This spatial arrangement is selected for minimizing disturbances. Thus, the dividers 8 simultaneously receive a reset within the mixer units or they are set in defined manner to common starting values by a preload.

In the present exemplary embodiment, so-called regenerative dividers are used as frequency converters 8, which can also perform an arbitrarily adjustable odd-numbered division of the local oscillator frequency as disclosed in, among other things, WO 01015313 A1. In contrast, conventional dividers are counters which implement a predetermined division, for example, via overflow control. This only provides for an even-numbered division 1:N with N=2, 3, 4, 5, . . . . In such a regenerative divider, a reset is carried out via a switch in at least one feedback branch. The switch is closed in defined manner by the reset pulse so that the divider, and thus the mixer as an entire assembly, immediately begins to operate.

Without any further representation in drawings, it is pointed out that a method as described above can also be used in a MIMO transmitter and thus also in a MIMO transmitting and receiving unit. In this case, the receiving paths 2 would be arranged as receiving and/or transmitting paths 2. In every case, the proposed arrangement can be easily integrated in a CMOS circuit.

The present invention thus has the following significant advantages, among others:

- Mixing frequencies at several mixer units fed by only one local oscillator always have a known and fixed phase relationship and are even always all in phase in the ideal case. Thus, no additional phase shift occurs in the output signals of the individual mixer units after the restart even after a pause or when using a time slot method.
- The channel estimations can thus be retained so that, for saving high computing power, the channel estimation, assuming a channel which only changes slowly, does not have to be performed before each restart even in a MIMO method.
- Direct conversion architectures and regenerative dividers can be used with synchronization of the respective dividers by reset and preload.
- Easy integration into a CMOS circuit which can also be arranged as a completely integrated monolithic circuit.

What is claimed is:

1. A method of operating a system in which a signal processing device is subject to phases of temporary disconnections, the method comprising:

switching on the signal processing device;

in response to the signal processing device being switched on, causing an initialization circuit to initialize a first mixer unit and a second mixer unit, the first mixer unit comprising a first mixer, a second mixer and a first frequency converter, the first frequency converter of the first mixer unit being connected to the initialization circuit, the second mixer unit comprising a third mixer, a fourth mixer and a second frequency converter, the second frequency converter of the second mixer unit being connected to the initialization circuit;

wherein the initialization circuit initializes the first mixer unit and the second mixer unit using a reset signal which simultaneously addresses the first mixer unit of a first data processing path and the second mixer unit of a second data processing path, the first data processing path being arranged in parallel to the second data processing path;

wherein the first frequency converter and the second frequency converter each receive a signal from an oscillator circuit.

2. The method of claim 1, wherein the phases of temporary disconnections correspond to transmitting and/or receiving signals in defined time slots.

3. The method of claim 1, wherein the first frequency converter and the second frequency converter each receive the reset signal.

4. The method of claim 1, wherein:

the first mixer unit includes a first phase shifter; and the second mixer unit includes a second phase shifter.

5. The method of claim 1, wherein:

the first frequency converter includes a first regenerative divider; and the second frequency converter includes a second regenerative divider.

6. A device with high channel capacity in a form of a multi-transmitter and/or multi-receiver system in which antennas are arranged in a spatially distributed manner, the device comprising:

a signal processing device, the signal processing device configured to switch between being connected and being disconnected;

an initialization circuit;

a first mixer unit on a first receiving and/or transmitting path, the first mixer unit including a first mixer, a second mixer and a first frequency converter, the first frequency converter of the first mixer unit being connected to the initialization circuit;

a second mixer unit on a second receiving and/or transmitting path, the second mixer unit including a third mixer, a fourth mixer and a second frequency converter, the second frequency converter of the second mixer unit being connected to the initialization circuit; and an oscillator circuit coupled to the first frequency converter and the second frequency converter;

wherein the initialization circuit is configured to initialize the first mixer unit and the second mixer unit when the signal processing device is switched on;

wherein the initialization circuit initializes the first mixer unit and the second mixer unit using a reset signal which simultaneously addresses the first mixer unit of a first data processing path and the second mixer unit of a second data processing path, the first data processing path being arranged in parallel to the second data processing path.

7. The device of claim 6, wherein:

the first receiving and/or transmitting path and the second receiving and/or transmitting path are arranged in parallel.

8. The device of claim 6, wherein the first frequency converter includes a first regenerative divider and the second frequency converter includes a second regenerative divider, first and second regenerative dividers configured to adjust arbitrary divider ratios in the first mixer unit and the second mixer unit, respectively.

9. The device of claim 6, wherein the first mixer unit includes a first phase shifter and the second mixer unit includes a second phase shifter.

10. A mobile terminal comprising:

a signal processing device, the signal processing device configured to switch between being connected and being disconnected; and a receiver circuit comprising:

an initialization circuit;

a first mixer unit on a first individual receiving and/or transmitting path, the first mixer unit including a first mixer, a second mixer and a first frequency converter, the first frequency converter of the first mixer unit being connected to the initialization circuit;

a second mixer unit on a second receiving and/or transmitting path, the first mixer unit including a third mixer, a fourth mixer and a second frequency converter, the second frequency converter of the second mixer unit being connected to the initialization circuit; and an oscillator circuit coupled to the first frequency converter and the second frequency converter;

wherein the initialization circuit is configured to initialize the first mixer unit and the second mixer unit when the signal processing device is switched on;

wherein the initialization circuit initializes the first mixer unit and the second mixer unit using a reset signal which simultaneously addresses the first mixer unit of a first data processing path and the second mixer unit of a second data processing path, the first data processing path being arranged in parallel to the second data processing path.

11. The mobile terminal of claim 10, wherein the first frequency converter includes a first regenerative divider and the second frequency converter includes a second regenerative divider.

12. The mobile terminal of claim 11, wherein the first and second regenerative dividers are configured to adjust arbitrary divider ratios in the first mixer unit and the second mixer unit, respectively.

13. The mobile terminal of claim 10, wherein the first receiving and/or transmitting path and the second receiving and/or transmitting path are arranged in parallel.

14. Th mobile terminal of claim 10, wherein the first mixer unit includes a first phase shifter and the second mixer unit includes a second phase shifter.

* * * * *

UNITED STATES PATENT AND TRADEMARK OFFICE
CERTIFICATE OF CORRECTION

PATENT NO.        : 8,295,785 B2
APPLICATION NO.   : 11/577971
DATED             : October 23, 2012
INVENTOR(S)       : Frank Lillie It is certified that error appears in the above-identified patent and that said Letters Patent is hereby corrected as shown below:

In the Claims:

In column 8, line 12, in Claim 14, delete "Th" and insert -- The --, therefor.

Signed and Sealed this
Twenty-eighth Day of May, 2013

Teresa Stanek Rea
*Acting Director of the United States Patent and Trademark Office*